(12) United States Patent
Zhou

(10) Patent No.: US 9,147,902 B2
(45) Date of Patent: Sep. 29, 2015

(54) MICROBIAL FUEL CELL STACK

(75) Inventor: Shungui Zhou, Guangzhou (CN)

(73) Assignee: GUANGDONG INSTITUTE OF ECO-ENVIRONMENTAL AND SOIL SCIENCES, Guangzhou, Guangdong Province (CN)

( * ) Notice: Subject to any disclaimer, the term of this patent is extended or adjusted under 35 U.S.C. 154(b) by 1126 days.

(21) Appl. No.: 12/498,023

(22) Filed: Jul. 6, 2009

(65) Prior Publication Data

US 2010/0003543 A1 Jan. 7, 2010

(30) Foreign Application Priority Data

Jul. 4, 2008 (CN) .......................... 2008 1 0029221
Sep. 11, 2008 (CN) .......................... 2008 1 0198453

(51) Int. Cl.
*H01M 8/16* (2006.01)
(52) U.S. Cl.
CPC ............... *H01M 8/16* (2013.01); *Y02E 60/527* (2013.01)
(58) Field of Classification Search
CPC .............................. H01M 8/16; Y02E 60/527
USPC ................................................. 429/400–535
See application file for complete search history.

(56) References Cited

U.S. PATENT DOCUMENTS

| | | | |
|---|---|---|---|
| 5,286,939 A * | 2/1994 | Martin ........................ | 219/718 |
| 2005/0037252 A1* | 2/2005 | Pham ............................. | 429/31 |
| 2006/0144800 A1* | 7/2006 | Barreras et al. ............... | 210/744 |
| 2007/0048577 A1* | 3/2007 | Ringeisen et al. ............. | 429/30 |
| 2007/0259217 A1* | 11/2007 | Logan .............................. | 429/2 |
| 2008/0241607 A1* | 10/2008 | Owejan et al. .................. | 429/13 |

FOREIGN PATENT DOCUMENTS

| | | | |
|---|---|---|---|
| CN | 200610144991.6 | | 9/2007 |
| CN | 200610104081 | * | 2/2008 |
| CN | 200610104081.5 | | 2/2008 |
| CN | 200710144550.0 | | 3/2008 |
| CN | 200710144804.9 | | 5/2008 |

* cited by examiner

*Primary Examiner* — Milton I Cano
*Assistant Examiner* — Ling R Zeng
(74) *Attorney, Agent, or Firm* — Muncy, Geissler, Olds & Lowe P.C.

(57) ABSTRACT

The present invention discloses a microbial fuel cell stack, which comprises a plurality of microbial fuel cells and is characterized in that the microbial fuel cell includes a perforated frame, a cathode and an anode, and that the cathode wraps the perforated frame to form an anode chamber, and that the anode is arranged inside the anode chamber. Wires are respectively extended from the cathode and the anode. The microbial fuel cells are connected head to tail sequentially via pipes, and thus the anode chambers thereof interconnect each other. The first microbial fuel cell of the cell stack has a feeding port, and the last one has a discharging port.

6 Claims, 4 Drawing Sheets

MICROBIAL FUEL CELL STACK

This application claims foreign priority under 35 U.S.C. 119 to China Patent Application No. 200810029221.6, filed Jul. 04, 2008 and 200810198453.4, filed Sep. 11, 2008, the entire contents of which are incorporated herein by reference.

FIELD OF THE INVENTION

The present invention relates to a microbial fuel cell technology, particularly to a microbial fuel cell stack.

BACKGROUND OF THE INVENTION

MFC (Microbial Fuel Cell) converts chemical energy of organic compounds into electric energy and thus has the functions of power generation and waste treatment simultaneously. Many types of waste can be used as the fuel of MFC, including domestic wastewater, high-density organic wastewater, and human/animal excrement. Therefore, MFC can generate electric energy and effectively dispose organic waste.

Below is the principle of MFC: Organic materials are oxidized by microbes in an anaerobic anode chamber; the microbes capture electrons and transfer electrons to the anode; electrons flow through the external circuit and reach the cathode; protons pass through the exchange membrane to reach the cathode and react with oxygen there to form water; thus is formed a loop for current. China application No. 200710144804.9 and No. 200710144550.0 respectively disclosed microbial fuel cells both involving the design of electrodes and wires and the selection of catalysts. A China application No. 200610104081.5 disclosed a microbial cell device involving a filmed cathode consisting of a plate cathode and a membrane stuck with each other. However, a single microbial fuel cell is hard to output the required voltage and current at present. The required voltage and current must be achieved via assembling MFCs in series or in parallel to form an MFC stack. A China application No. 200610144991.6 disclosed a stackable air-cathode single-chamber MFC. However, the prior-art patent adopts an expensive proton-exchange membrane. Although the single-chamber MFCs are stackable, the fuel/wastewater is fed into/drained out from each cell of the cell stack separately. Therefore, the stackable air-cathode single-chamber MFC is hard to prevail.

The conventional MFC has the following disadvantages:

1. The conventional MFCs originated from PEMFC (Proton Exchange Membrane Fuel Cell) and adopt an expensive proton exchange membrane as the separator. The output power of the conventional MFC is lower than that of PEMFC by two or three orders of magnitude. The proton exchange membrane-based MFC is impractical and short of utility.
2. Oxygen needs continuously supplying to the cathode for oxygen reduction reaction. The oxygen supply process consumes more energy than the energy generated. Therefore, the conventional MFC is unable to sustain the operation by itself. In 2005, an US environmental engineering specialist Logan proposed the first air-cathode single-chamber MFC, wherein the cathode chamber is omitted, and oxygen is supplied by passive aeration, whereby is possibly achieved a positive net energy output. Although a single cell of this type can work, the cells of this type are hard to stack for amplifying output.
3. The structure and operation of the conventional MFCs are unfavorable for amplifying output.

SUMMARY OF THE INVENTION

The primary objective of the present invention is to provide a microbial fuel cell stack, which features expansion, compactness, low price, high output power density, a joint feeding port, a joint discharging port, and high COD (Chemical Oxygen Demand) reduction capability.

To achieve the abovementioned objective, the present invention proposes a microbial fuel cell stack, which comprises a plurality of microbial fuel cells, wherein the microbial fuel cell includes a perforated frame, a cathode wrapping the perforated frame to form an anode chamber, and an anode arranged inside the anode chamber, and wherein wires are extended from the cathode and the anode, and wherein the microbial fuel cells are joined tail-to-head via pipes to interconnect the anode chambers, and wherein the cell stack has a feeding port and a discharging port.

The pipe interconnecting the microbial fuel cells has a diameter from one fifth to one third of the diameter of the microbial fuel cell.

The frames and pipe is a one-piece component, wherein the pipe is perforated segment by segment to form the frames. Two adjacent frames have a space of 2-20 cm.

The pipe is made of an insulating material and has a diameter of 5-20 cm. The frame has a length of 10-30 cm. A hole-drilling method is used to perforate the pipe to form the holes with a diameter of 0.5-2 cm and a hole density of 100-3000 holes/$m^2$.

Preferably, the pipes include a plurality of elbows, and the pipes are connected with the elbows to form a spiral-type structure. The microbial fuel cells are arranged along the spiral-type structure to extend horizontally, vertically and layer by layer to amplify the output thereof.

The anode is made of graphite grains, a carbon felt, a carbon fabric, or a carbon fiber brush. The cathode is formed via hot-pressing a catalyst-containing carbon fabric and an ion exchange membrane.

Preferably, the cathode has a waterproof air-permeable layer, a fabric-based layer, and a conductive catalytic layer sequentially from the internal to the external.

The waterproof air-permeable layer is a coating of PTFE (polytetrafluoroethylene) or PVDF (polyvinylidene fluoride). Preferably, the waterproof air-permeable layer is formed via coating PTFE or PVDF on one side of the fabric-based layer with a PTFE or PVDF density of 1.0-3.0 mg/$cm^2$.

The conductive catalytic layer is a coating of a mixture of an oxygen reduction catalytic and a conductive paint by a ratio of 1:4-15. It is preferable that the oxygen reduction catalytic has a distribution of 0.5-5.0 mg/$cm^2$.

The conductive paint is preferably a graphite-based conductive paint or a nickel-based conductive paint. The oxygen reduction catalytic is preferably platinum, pyr-FePc (pyrolyzed iron(ll) phthalocyanine), CoTMPP (cobalt tetramethoxyphenylporphyrin), or electrolyzed $MnO_2$ (manganese dioxide).

In another embodiment, the cathode has a waterproof air-permeable fabric and a conductive catalytic layer sequentially from the internal to the external. The conductive catalytic layer is a coating of a mixture of an oxygen reduction catalytic and a conductive paint by a ratio of 1:4-15. It is preferable that the oxygen reduction catalytic has a distribution of 0.5-5.0 mg/$cm^2$. The conductive paint is preferably a graphite-based conductive paint or a nickel-based conductive paint. The oxygen reduction catalytic is preferably platinum, pyr-FePc, CoTMPP, or electrolyzed $MnO_2$.

Wastewater is pumped into the pipes of the microbial fuel cell stack via the feeding port. When the wastewater fills up the pipes, wastewater feeding is stopped. Then, the loop of the cell stack is conducted, and microbes begin to generate electric energy. When the power output is stabilized, wastewater is supplied again. Thereby, wastewater is sequentially processed by a plurality of cells and then drained out from the discharging port.

The present invention is characterized in that the pipe wrapped by a filmed cathode is used as the anode chamber, and that oxygen is supplied to the cathode via passive aeration, and that wastewater is fed into the cells via a joint feeding port, continuously and sequentially processed by many cells to achieve a discharge standard, and then drained out from a joint discharging port. The present invention can effectively increase the voltage and current of an MFC stack. The present invention needn't consume power to actively supply oxygen. Further, the present invention has a compact structure and occupies less space. Further, the spiral-type structure enables the expansion of the present invention. Furthermore, the present invention is inexpensive and easy to maintain. Moreover, the present invention has high output power density and superior capability of reduce COD. Therefore, the present invention should be very useful in industry.

DETAILED DESCRIPTION OF THE PREFERRED EMBODIMENTS

Embodiment I

Figure 1:
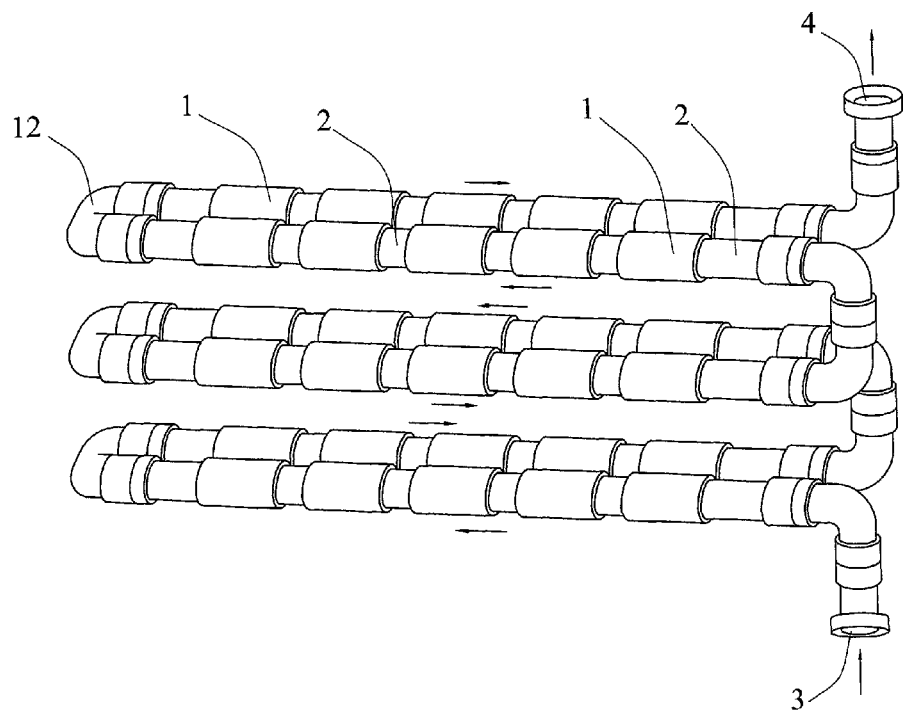
FIG. 1 is a diagram schematically showing a spiral-type MFC stack according to the present invention.
Figure 2:
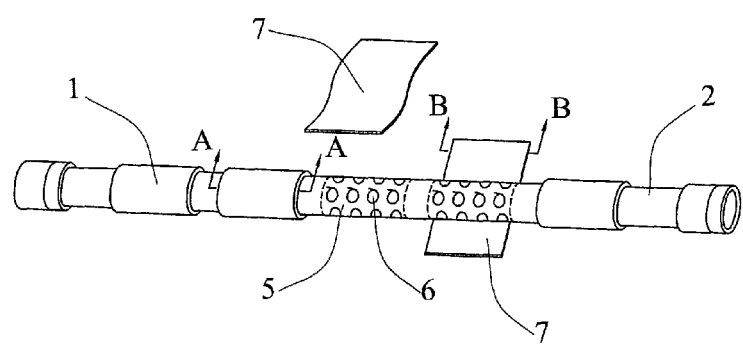
FIG. 2 is an exploded view schematically showing the structure of a frame of a microbial fuel cell and a filmed cathode according to the present invention.

As shown in FIG. 1 and FIG. 2. A 5 cm-diameter PVC (polyvinylchloride) pipe is fabricated into frames 5 having a length of 13 cm segment by segment. Each PVC pipe is fabricated into five microbial fuel cells 1. Because of the continuity of the pipes 2, the anode chambers of the five microbial fuel cells 1 connect head to tail sequentially and interconnect each other. In the embodiment shown in FIG. 1, two PVC pipes are arranged in parallel to form one layer of the MFC stack. In FIG. 1, six PVC pipes are interconnected by elbows 12 to form three layers. The ends of the first PVC pipe and the last PVC pipe respectively have a feeding port 3 and a discharging port 4. Thus, the thirty pieces of microbial fuel cells 1 form a three-layer MFC stack. Wastewater enters the MFC stack from the feeding port 3, flows through all the microbial fuel cells 1 and then drains out from the discharging port 4. In FIG. 1, the arrows indicate the flow direction of the wastewater.

Figure 3:
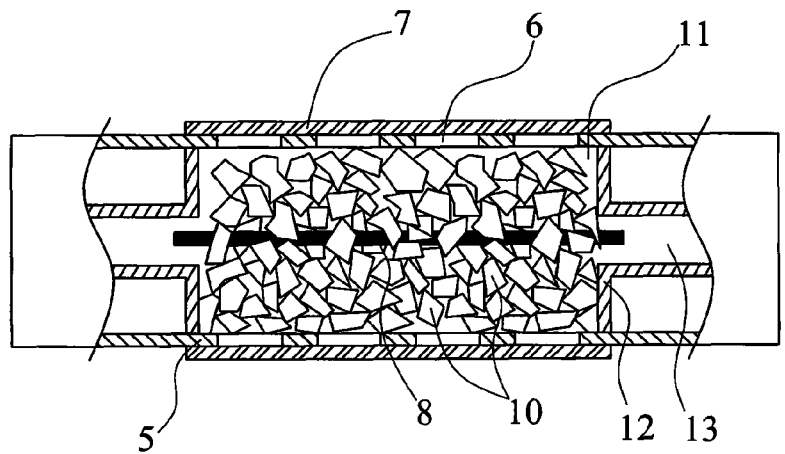
FIG. 3 is a sectional view of an anode chamber along Line 3-3 in FIG. 2 according to one embodiment of the present invention.

As shown in FIG. 2, the wall of the frame 5 is perforated to from holes 6 with a diameter of 1 cm and a hole density of 2500 holes/$m^2$. The external surface of the perforated frame 5 is wrapped with a cathode 7 to form an anode chamber 11 of the microbial fuel cell 1. The anode chamber 11 is filled with graphite grains 10 to function as an anode. Refer to FIG. 3 for an anode structure according to Embodiment I of the present invention. In this embodiment, the anode structure has a graphite bar 8 in the middle of the graphite grains 10, and the graphite bar 8 is used to electrically interconnect the dispersive graphite grains 10. As the filling of the anode chamber 11 is dispersive anode materials, two insulating separation boards 12 are installed at two ends of the anode chamber 11. The separation board 12 is made of a PVC plate, an organic glass plate, or other insulating boards normally used in the field. The separation board 12 has a channel 13 allowing wastewater to flow through. The diameter of the channel 13 is about one-third the diameter of the frame 5. A cascade MFC stack can be formed via connecting the graphite bar 8 of one MFC 1 with the cathode 7 of next MFC 1 by wires.

Figure 5:
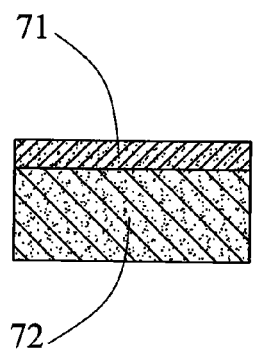
FIG. 5 is a sectional view of a cathode along Line 5-5 in FIG. 2 according to one embodiment of the present invention.

Refer to FIG. 5 a sectional view of the cathode 7 containing a cation exchange membrane according to the present invention. The cathode 7 is formed via hot-pressing a cation exchange membrane 71 and a platinum-containing carbon fabric 72 at a temperature of 120° C. for 5 minutes. The platinum-containing carbon fabric 72 is fabricated according to the following steps: 1. providing a carbon fabric (16 cm long and 13 cm wide); 2. adding 0.12 g 20% platinum-containing carbon powder into a weighing bottle, wetting the carbon powder with 0.3 ml water, adding 12 ml isopropanol into the weighing bottle to function as a dispersing agent, adding 0.46 ml 5% Nafion into the weighing bottle, stirring the mixture into paste, and dispersing the paste ultrasonically for 30 minutes; 3. uniformly applying the paste-like mixture onto the dry carbon fabric by a brush, and placing the paste-coated carbon fabric in a vacuum environment at a temperature of 100° C. for 3 hours to complete the platinum-containing carbon fabric.

The wastewater of a brewery is experimentally used as the fuel of the MFC stack according to Embodiment I of the present invention. The MFC stack is operated at a temperature range of 15-35° C. Firstly, the discharging port 4 is closed. Via the feeding port 3 is pumped into the pipes brewery wastewater inoculated with a type of electricity-generating microbes and having COD of 3010 mg/L. The brewery wastewater flows inside the pipe along the discharging port 4 direction indicated by the arrows. When having filled up the MFC stack, the brewery wastewater is no more fed into the pipes. Next, the loop is conducted and connected with the external resistance being 1000Ω. If the output voltage reaches over 5V, it means that the MFC stack operates successfully. Next, the discharging port 4 is opened, and the brewery wastewater is pumped into the pipe from the feeding port 3 continually, and the flow rate is regulated to keep the wastewater staying in the MFC stack for 24 hours. After one year's operation, it is proved that the MFC stack can process wastewater with electricity generated continuously and stably at the same time.

Figure 8:
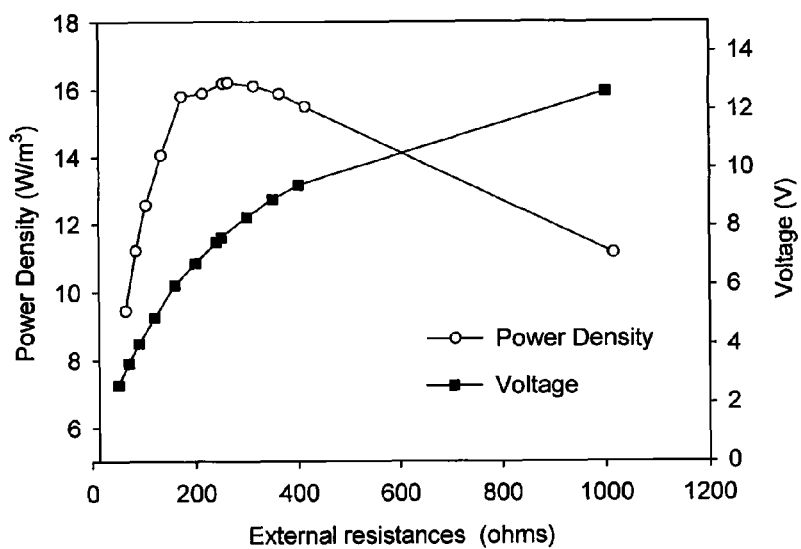
FIG. 8 is a diagram showing the power generation performance of a MFC stack according to one embodiment of the present invention.

The processed brewery wastewater has COD lower than 200 mg/L. FIG. 8 shows that the MFC stack has an open-circuit voltage of 12.6V and a maximum volume output power density reaches 16.3 W/m$^3$.

Embodiment II

Figure 4:
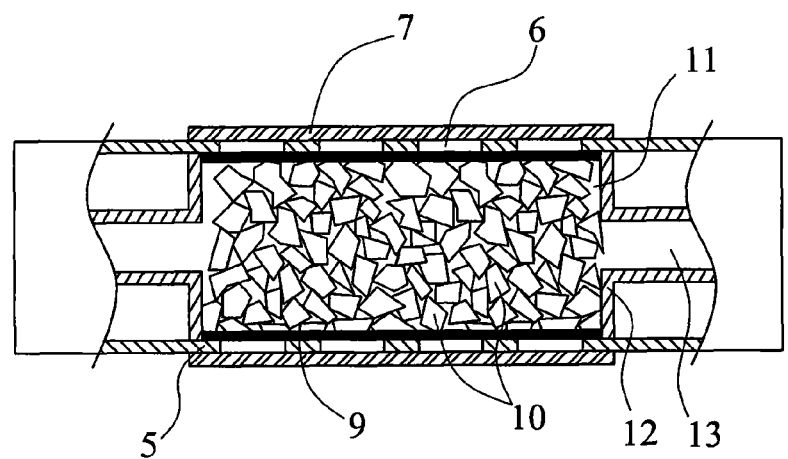
FIG. 4 is a sectional view of an anode chamber along Line 3-3 in FIG. 2 according to another embodiment of the present invention.

Embodiment II is different from Embodiment I in the structures of the anode chamber and the cathode. Refer to FIG. 4. A PVC pipe with 23 cm in length and 5 cm in diameter is used as the frame 5. On the frame 5 is perforated holes 6 with a diameter of 1 cm and a hole density of 1000 holes/m$^2$. A 13 cm long, 14.5 cm wide and 0.5 cm thick graphite felt 9 is rolled up to have a cylinder form. The cylindrical graphite felt 9 is placed in the pipe and filled up with graphite grains 10. A titanium wire connects with the graphite felt 9 to function as the conductive wire of the anode. The graphite felt 9 of one MFC is connected to the cathode 7 of next MFC with the titanium wire sequentially to assemble thirty pieces of MFCs into a cascade MFC stack.

Figure 6:
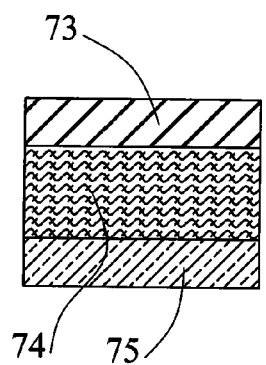
FIG. 6 is a sectional view of a cathode along Line 5-5 in FIG. 2 according to another embodiment of the present invention.

Refer to FIG. 6 for the structure of a cathode. In Embodiment II, the cathode 7 is a fabric-based cathode and includes a waterproof air-permeable layer 75, a fabric-based layer 74 and a conductive catalytic layer 73. A piece of 14.5 cm long, 17.5 cm wide and 0.6 mm thick commercial canvas is used as the fabric-based layer 74. The cathode 7 is fabricated according to the following steps: processing the canvas to have waterproofness and air-permeability: dissolving 0.5 g PVDF in 7.0 ml N-methyl-2-pyrrolidone, uniformly stirring the mixture, evenly applying the mixture onto one surface of the canvas to form the waterproof air-permeable layer 75, air-drying the waterproof air-permeable layer 75 for 12 hours, and baking the waterproof air-permeable layer 75 at a temperature of 80° C. for 1 hour, whereby the waterproof air-permeable layer 75 has a PVDF density of 2.0 mg/cm$^2$; preparing the slurry of a mixture of an oxygen reduction catalytic and a conductive paint: ultrasonically dispersing the mixture of 1.25 g electrolyzed MnO$_2$ (the oxygen reduction catalytic) and 6.0 g nickel-based conductive paint for 15 minutes; forming the conductive catalytic layer 73: uniformly applying the mixture slurry on the surface opposite to the waterproof air-permeable layer 75 on the canvas, air-drying the conductive catalytic layer 73 for 12 hours, and baking the conductive catalytic layer 73 at a temperature of 80° C. for 1 hour, whereby the conductive catalytic layer 73 has an MnO$_2$ density of 5.0 mg/cm$^2$.

The voltammetry and a digital multimeter are used to measure the volume resistivity of the coating on the surface of the fabric-based cathode assembly. The pencil hardness test method (GB/T 6739-1996) is used to test the hardness of the coating. Table.1 shows the results of the abovementioned tests. It can be seen in Table.1 that the coating of the fabric-based cathode is durable and has high abrasion resistance, and that the coating has a low volume resistivity and a superior electric conductivity, and that water soaking does not affect the electric conductivity.

TABLE 1

Parameters of the Conductive Catalytic Coating

| Parameter | Fabric-Based Cathode |
| --- | --- |
| Thickness (um) | 12 ± 1.5 |
| Pencil hardness | 4H |
| Volume resistivity (10$^{-2}$ Ωcm) | 1.35 ± 0.04 |
| Volume resistivity after 24 hour water soaking (10$^{-2}$ Ωcm) | 1.41 ± 0.05 |

Figure 9:
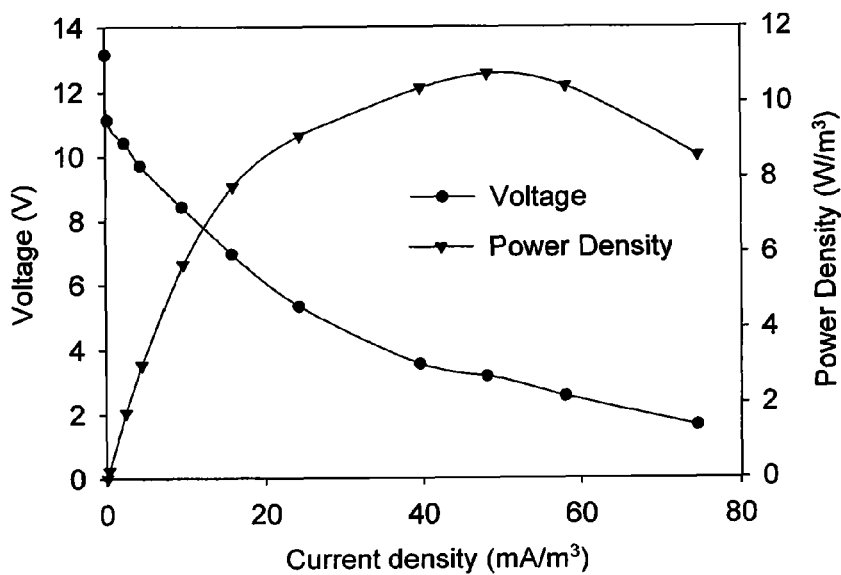
FIG. 9 is a diagram showing the power generation performance of a MFC stack according to another embodiment of the present invention.

Below are described the experiment for verifying the MFC stack of this embodiment. Via the feeding port 3 is pumped into the pipes starch wastewater inoculated with a type of electricity-generating microbes and having COD of 2426 mg/L. The starch wastewater flows inside the pipes along the discharging port 4 direction indicated by the arrows. When having filled up the MFC stack, the starch wastewater is no more fed into the pipes, and the feeding port 3 and the discharging port 4 are closed. Next, the loop is conducted and connected with the external resistance being 1000Ω. If the input voltage reaches over 5V, it means that the MFC stack operates successfully. Next, the discharging port 4 is opened, and the starch wastewater is pumped into the feeding port 3 continually, and the flow rate is regulated to keep the wastewater staying in the MFC stack for 36 hours. After three months' operation, it is proved that the MFC stack can process wastewater with electricity generated continuously and stably at the same time. The processed starch wastewater has COD lower than 200 mg/L. FIG. 9 shows that the MFC stack has an open-circuit voltage of 13.2V and a maximum volume output power density of 10.8 W/m$^3$.

Embodiment III

Embodiment III is different from Embodiment II in the material of the cathode. A piece of 29 cm long, 35 cm wide and 0.5 mm thick denim is used as the fabric-based layer 74. The cathode 7 is fabricated according to the following steps: dissolving 3.0 g PTFE in 40.0 ml N-methyl-2-pyrrolidone, uniformly stirring the mixture, evenly applying the mixture onto one surface of the denim, air-drying the coated denim for 10 hours, and baking the air-dried drying coated denim at a temperature of 70° C. for 2 hours, whereby the coated denim has a PTPE density of 3.0 mg/cm$^2$; ultrasonically dispersing the mixture of 1.0 g CoTMPP (the oxygen reduction catalytic) and 25.0 g graphite-based conductive paint for 15 minutes into a slurry; evenly applying the slurry on the other surface of the denim, air-drying the double-coated denim for 10 hours, and baking air-dried double-coated denim at a temperature of 70° C. for 2 hours, whereby the double-coated denim has a CoTMPP density of 1.0 mg/cm$^2$.

Embodiment IV

Figure 7:
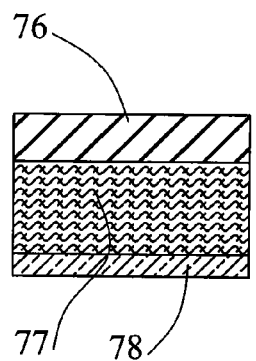
FIG. 7 is a sectional view of a cathode along Line 5-5 in FIG. 2 according to a yet another embodiment of the present invention.

Embodiment IV is different from Embodiment II in the structure and the material of the cathode. Refer to FIG. 7 for the structure of the cathode 7 of Embodiment III. In Embodiment VI, the cathode 7 includes a waterproof air-permeable fabric 77 and a conductive catalytic layer 76.

A piece of 14.5 cm long, 17.5 cm wide and 0.3 mm thick GORE-TEX fabric is used as the waterproof air-permeable fabric 77. The GORE-TEX fabric has an expanded microporous PTFE coating 78 thus has intrinsic waterproofness and air-permeability. Therefore, waterproof and air-permeable processing is unnecessary for the GORE-TEX fabric. The cathode 7 is fabricated according to the following steps: ultrasonically dispersing the mixture of 0.4 g pyr-FePc (the oxygen reduction catalytic) and 4.5 g copper-based conductive paint for 15 minutes into a slurry; evenly applying the slurry on the back side of the GORE-TEX fabric, air-drying the coated GORE-TEX fabric for 12 hours, and baking the air-dried coated GORE-TEX fabric at a temperature of 80° C. for 1 hour, whereby the coated GORE-TEX fabric has a pyr-FePc density of 2.1 mg/cm$^2$.

Embodiment V

Embodiment V is different from Embodiment VI in the material of the cathode. A piece of 29 cm long, 35 cm wide and 0.3 mm thick eVENT fabric is used as the waterproof air-permeable fabric 77. The eVENT fabric has an expanded microporous PTFE coating 78 thus has intrinsic waterproofness and air-permeability. Therefore, waterproof and air-permeable processing is unnecessary for the eVENT fabric. The cathode 7 is fabricated according to the following steps: ultrasonically dispersing the mixture of 5.0 g electrolyzed $MnO_2$ (the oxygen reduction catalytic) and 15 g silver-based conductive paint for 15 minutes into a slurry; evenly applying the slurry on the back side of the eVENT fabric, air-drying the coated eVENT fabric for 12 hours, and baking the air-dried coated eVENT fabric at a temperature of 80° C. for 2 hours, whereby the coated eVENT fabric has an $MnO_2$ density of 5.0 $mg/cm^2$.

Refer to Table.2 for the prices of the materials of cathode assemblies. It can be seen in Table.2 that the price of the fabric cathode assembly of the present invention is only 1/5-1/20 of the price of the conventional cathode assembly.

TABLE 2

Prices of Materials of Cathode Assemblies

Cathode assembly price (dollar/$m^2$)[a]

| Separator | Conductive material | Catalyst | Sum[b] | Reference |
|---|---|---|---|---|
| Proton exchange membrane (9520) | Carbon fiber fabric (6800) | Pt (4760) | 21080 | Liu (2004)[c] |
| Ion exchange membrane (540) | Carbon fiber fabric (6800) | Pt (4760) | 12100 | Kim (2009)[d] |
| Ion exchange membrane (540) | Carbon fabric (600) | $MnO_2$ (2.0) | 1142 | Zhang (2009)[e] |
| Canvas (23.8) | Ni-based conductive paint (40.8) | $MnO_2$ (2.0) | 66.6 | Embodiment II |
| Denim (23.8) | Graphite-based conductive paint (20.4) | CoTMPP (200) | 244.2 | Embodiment III |
| Waterproof air-permeable fabric (35) | Cu-based conductive paint (40.8) | pyr-FePc (120) | 195.8 | Embodiment IV |
| Waterproof air-permeable fabric (35) | Ag-based conductive paint (70.6) | $MnO_2$ (2.0) | 107.6 | Embodiment V |

[a]Based on the purchase price
[b]the price of the cathode assembly per square meter (dollar/$m^2$)
[c]Liu, H., et al. 2004. Environ. Sci. Technol. 38 (14): 4040-4046
[d]Kim, J. R., et al. 2009. J. Power Sources 187 (2): 393-399
[e]Zhang, L. X., et al. 2009. Biosensors and Bioelectronics 24:2825-2829

What is claimed is:

1. A microbial fuel cell stack, comprising:
   a feeding port;
   a discharging port;
   a plurality of microbial. fuel cells disposed between the feeding port and the discharging port, each of the plurality of microbial fuel cells including a cathode, a perforated frame wrapped by the cathode, an anode chamber formed within the perforated frame, and an anode arranged inside said anode chamber, the cathode including a waterproof air-permeable layer, a fabric-based layer and a conductive catalytic layer from the inside to the outside, wherein the waterproof air-permeable layer is a PTPR (polytetrafluoroethlene) coating or a PVDF (polyvinylidenefluoride) coating that are coated on one surface of the fabric-based layer by a distribuation of 1.0-3.0 $mg/cm^2$, and wherein the plurality of microbial fuel cells are connected head to tail sequentially via pipes whereby the adjacent anode chambers interconnect with each other, and wherein the perforated frame includes a plurality of holes with a diameter of 0.5 -2 cm, and wherein the anode arranged inside the anode chamber connects to the cathode wrapping the perforated frame of next microbial fuel cell by a wire to form a series connection, wherein the pipe interconnecting the microbial fuel cells has a diameter from one fifth to one third of a diameter of the microbial fuel cell, and wherein the pipes and the frames is an one-piece component and segments of the pipe are perforated. to function as the frames and a space between two adjacent the frames is between 2 and 20 cm, and wherein the pipe is an insulating pipe having a diameter of 5-20 cm and the frame has a length of 10-30 cm and the holes have a hole density of 100-3000 holes/$m^2$.

2. The microbial fuel cell stack according to claim 1, wherein said pipes include elbows; said pipes are connected by said elbows to allow said microbial fuel cells to be arranged horizontally or vertically or to form a multi-layer structure.

3. The microbial fuel cell stack according to claim 1, wherein said anode is made of graphite grains, a carbon felt, a carbon fabric, or a carbon fiber brush.

4. The microbial fuel cell stack according to claim 1 wherein said conductive catalytic layer is a coating of a mixture of an oxygen reduction catalytic and a conductive paint.

5. The microbial fuel cell stack according to claim 4, wherein said oxygen reduction catalytic and said conductive paint is mixed by a ratio of 1: 4-15; said mixture of said oxygen reduction catalytic and. said conductive paint is coated on the other surface of said fabric-based layer.

6. The microbial fuel cell stack according to claim 4, wherein said conductive paint is a graphite-based conductive paint or a nickel-based conductive paint; said oxygen reduction catalytic contains platinum, pyr-FePc (pyrolyzed iron (11) phthalocyanine), CoTMPP (cobalt tetramethoxyphenylporphyrin), or electrolyzed MnO2 (manganese dioxide).

* * * * *